US005953195A

United States Patent [19]

Pagliuca

[11] Patent Number: 5,953,195

[45] Date of Patent: Sep. 14, 1999

[54] COAXIAL PROTECTOR

[75] Inventor: Emanuel Joseph Pagliuca, Schaumburg, Ill.

[73] Assignee: Reltec Corporation, Mayfield Heights, Ohio

[21] Appl. No.: 09/020,794

[22] Filed: Feb. 9, 1998

Related U.S. Application Data

[60] Provisional application No. 60/038,987, Feb. 26, 1997.

[51] Int. Cl.$^{6}$ ..... H02H 1/00

[52] U.S. Cl. ..... 361/120; 361/107; 361/111; 361/119

[58] Field of Search ..... 361/119, 120, 361/117, 110, 111, 107; 333/206

[56] References Cited

U.S. PATENT DOCUMENTS

| | | | |
|---|---|---|---|
| 4,062,054 | 12/1977 | Simokat | 361/119 |
| 4,156,886 | 5/1979 | Jones | 361/120 |
| 4,359,764 | 11/1982 | Block | 361/119 |
| 4,409,637 | 10/1983 | Block | 361/119 |
| 4,509,090 | 4/1985 | Kawanami et al. | 361/119 |
| 4,544,984 | 10/1985 | Kawanami et al. | 361/119 |
| 4,554,608 | 11/1985 | Block | 361/119 |
| 4,616,155 | 10/1986 | Guichard | 313/573 |
| 4,633,359 | 12/1986 | Mickelson et al. | 361/119 |
| 5,566,056 | 10/1996 | Chaudhry | 361/117 |
| 5,790,361 | 8/1998 | Minich | 361/111 |
| 5,790,362 | 8/1998 | Kasahara et al. | 361/117 |

FOREIGN PATENT DOCUMENTS 2083945 of 0000 United Kingdom .

*Primary Examiner*—Michael J. Sherry
*Attorney, Agent, or Firm*—Trexler, Bushnell, Giangiorgi & Blackstone, Ltd.

[57] ABSTRACT

A protector which is coupleable with a coaxial transmission line. The protector includes a gas tube assembly. The gas tube assembly has a first electrode which is coupleable with the inner conductor of the coaxial transmission line such that the first electrode becomes substantially aligned with the transmission line. The gas tube assembly also includes a second electrode which is coupleable with the outer conductor of the coaxial transmission line. Each of the first and second electrodes of the gas tube assembly has a discharge area, and the discharge areas are spaced apart from each other. A body portion is attached to the discharge areas defining a sealed chamber therebetween.

16 Claims, 3 Drawing Sheets

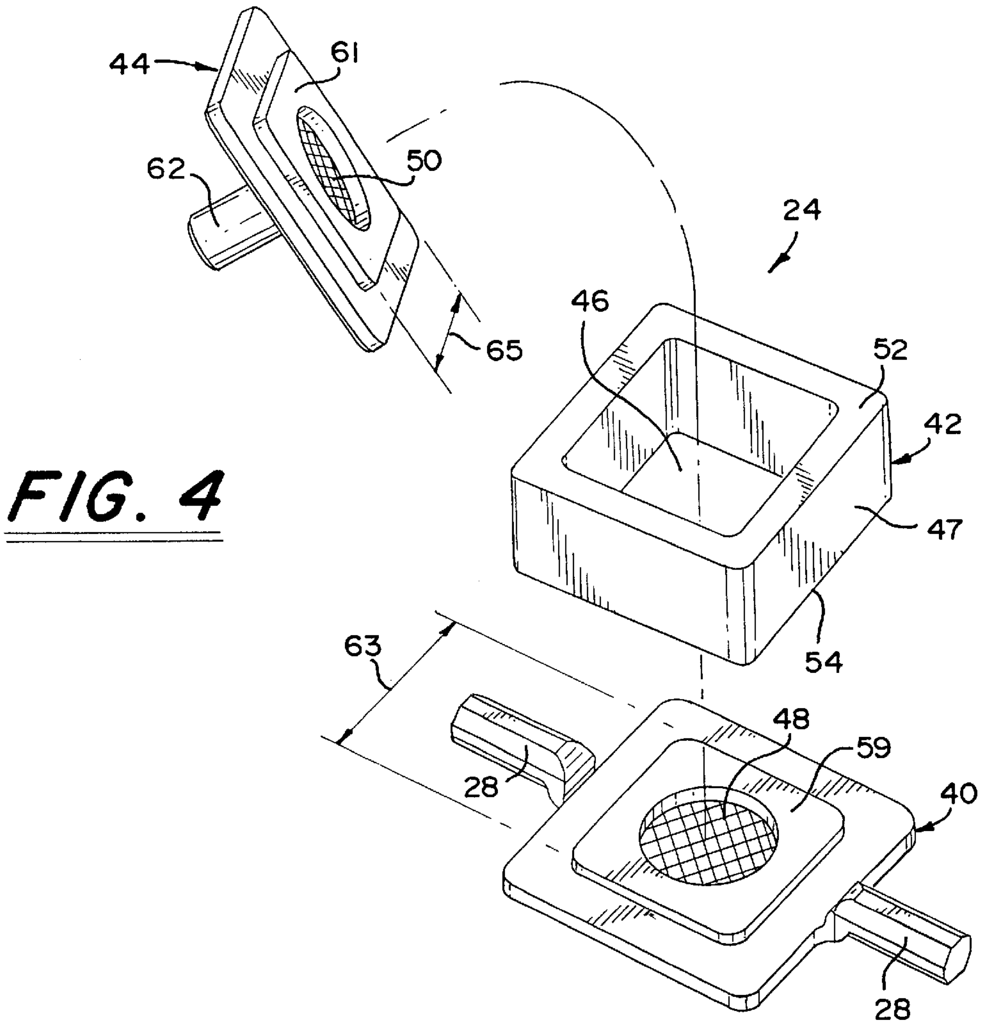
FIG. 4
FIG. 5
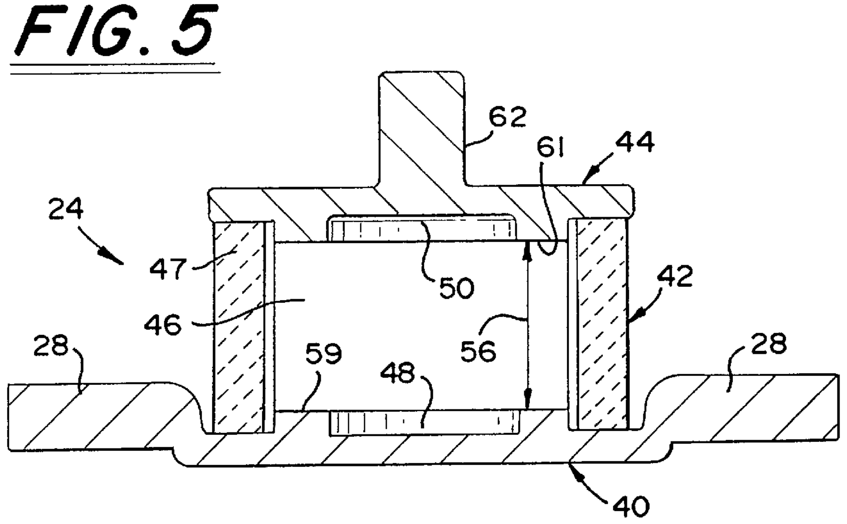

COAXIAL PROTECTOR

This application claims the benefit of U.S. Provisional Application No. 60/038,987, filed Feb. 26, 1997.

BACKGROUND

Various types of protectors have been designed and manufactured in the past for protecting coaxial transmission lines and associated equipment from damage due to transient surge voltages caused by lightning and induced AC power voltages.

The expansion of services on coaxial based network to include voice, video and data requires increased system reliability and transmission continuity. Broadband coaxial systems require a protector to handle surges and protect expensive electronic equipment without disturbing transmission signals.

These protectors generally consist of a gas discharge tube connected between the center conductor and the braided shield of the coaxial cable. The protectors include a housing which consists of a metal block, normally made of aluminum or brass, which is bored to include a passage for a center conductor and an enlarged cavity for housing the gas tube. The housing serves primarily as a mounting for a standardized gas tube and for the input and output connectors which are attached to the housing. The resulting protector is large in size, expensive to manufacture and generally adds considerable capacitance which requires extraordinary methods to match the impedance of the protector to the characteristic impedance of the coaxial transmission line.

The need for miniature, low cost and microwave transparent surge protectors has not been provided by the available devices. Several patents show available surge protectors. The patents include U.S. Pat. Nos. 4,633,359; 4,544,984; 4,509,090; and 4,409,637. The protectors disclosed in these patents generally consist of a discrete, "off-the-shelf" or "universal-type" gas tube which have been adapted for use in coaxial protector application. These gas tubes are generally of a universal-type construction and are not optimized for coaxial circuit protection. Use of these universal-type gas tubes for coaxial circuit protection results in poor microwave signal transmission and requires the use of complex configurations to compensate for the mismatch which is created by the relatively high capacitance of the gas tube and housing to the characteristic impedance of the coaxial line.

An example of this mismatch problem can be seen in U.S. Pat. No. 4,409,637 in which the description goes to great lengths to teach methods for creating a matched condition for the discrete universal type commercial gas tube utilized in the protector shown therein. The elaborate method of impedance matching and the housing needed to contain the gas tube greatly inflate the cost of the device as shown in the '637 patent.

OBJECTS AND SUMMARY

A general object of the present invention is to provide a protector which provides a conductive path that does not substantially impede microwave signals.

Another object of the present invention is to provide a protector which is relatively small in size and which is relatively inexpensive to provide.

Still another object of the present invention is to provide a protector which provides minimal insertion loss.

Briefly, and in accordance with the above, the present invention envisions a protector for providing protection to a transmission line when the protector is coupled therewith. The protector includes a gas tube assembly having a first electrode which is coupleable with the transmission line such that the first electrode becomes substantially aligned with the transmission line. The gas tube assembly also includes a second electrode spaced away from the first electrode. Each of the first and second electrodes of the gas tube assembly have a discharge area which discharge areas are spaced apart from each other.

BRIEF DESCRIPTION OF THE DRAWINGS

The organization and manner of the structure and function of the invention, together with the further objects and advantages thereof, may be understood by reference to the following description taken in connection with the accompanying drawings, wherein like reference numerals identify like elements, and in which:

FIG. 4 is an enlarged, exploded, perspective view of the gas tube assembly, as shown in FIGS. 1, 2 and 3, depicting a cover of the gas tube assembly rotated in order to show structures on the underside thereof; and FIG. 5 is an enlarged, cross-sectional, side elevational view of the gas tube assembly, as shown in FIGS. 1–4, showing the gas tube assembly removed from the housing depicted in FIGS. 1, 2 and 3.

DESCRIPTION

Figure 1:
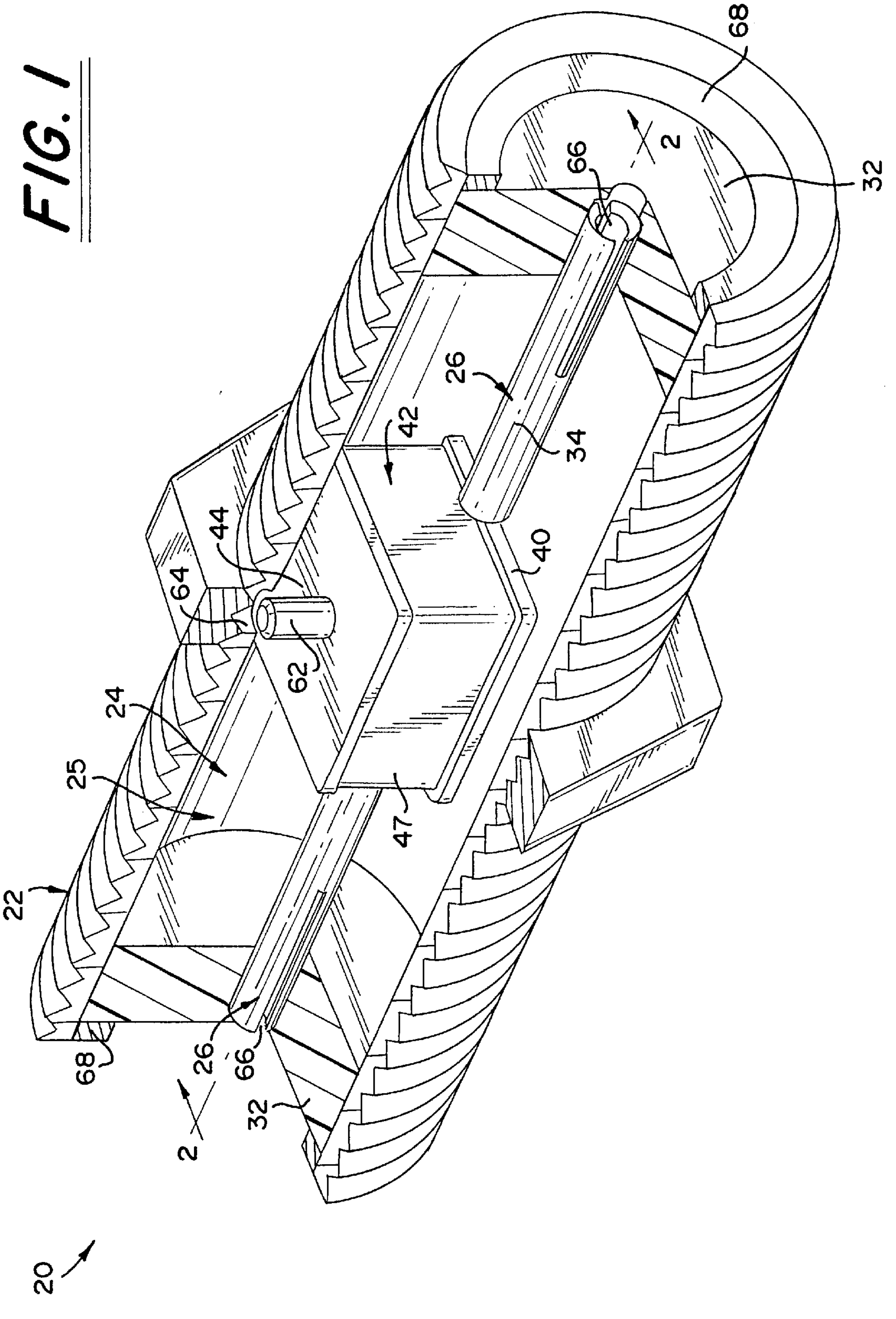
FIG. 1 is a partial fragmentary, partial cross-sectional, perspective view of a gas tube assembly of the present invention installed in a standard "F-F" type (female-female) coaxial connector housing.
Figure 3:
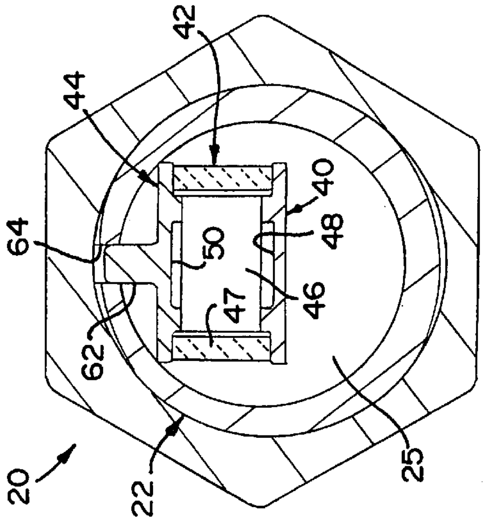
FIG. 3 is a transverse, cross-sectional, elevational view, taken along line 3—3 of FIG. 2, of the gas tube assembly retained in the housing as shown in FIGS. 1 and 2.

FIG. 1 illustrates a protector 20 which includes a housing 22 and a gas tube assembly 24 retained in a chamber 25 within the housing 22. The housing 22 is shown herein as having a "F-F"-type connector body. The connector body is used for coupling the connector, and the gas tube assembly 24 therein, to the inner conductor and the outer conductor of a standard coaxial transmission line to protect same from damage due to transient surge voltages and induced AC power voltages. While this F-F-type body is shown and will be described herein, it is envisioned that various other embodiments of the present invention employing the gas tube assembly 24 as specifically described herein may be devised. As such, this invention is not limited to the F-F-type connector body housing 22 as shown herein.

Figure 2:
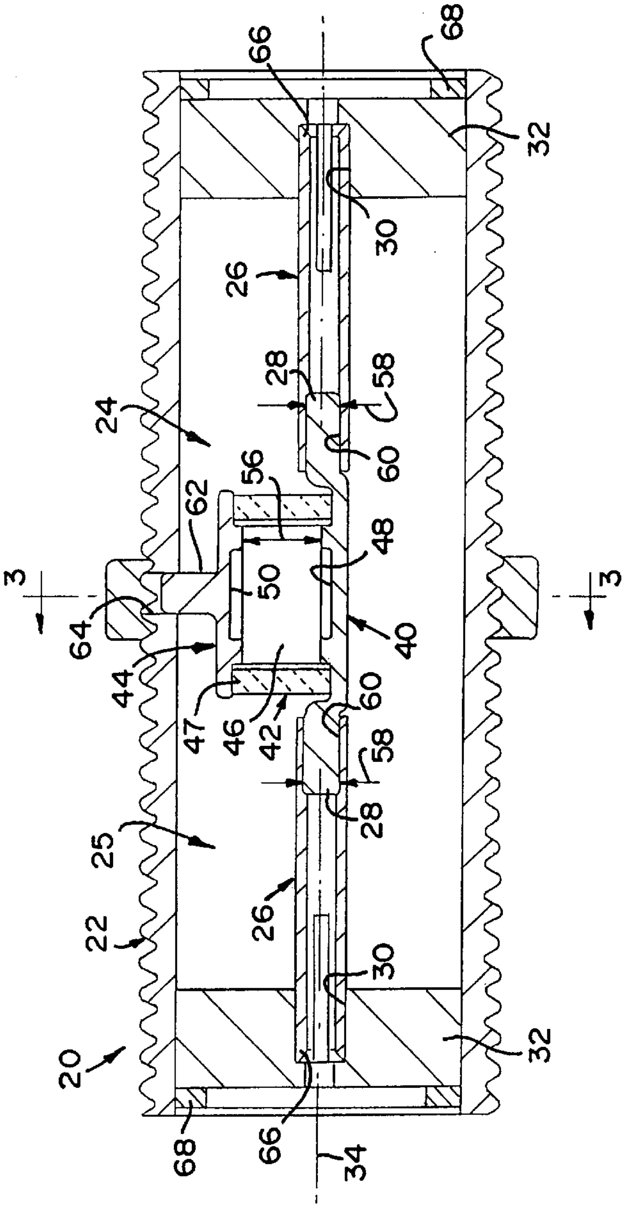
FIG. 2 is a longitudinal, cross-sectional, side elevational view, taken along line 2—2 of FIG. 1, of the gas tube assembly retained in the housing as shown in FIG. 1.

The protector 20 includes axially elongated contacts 26 which mate with end electrodes 28 of the gas tube assembly 24. The gas tube assembly 24 will be described in greater detail hereinbelow. The contacts 26 of the protector 20 extend towards opposite ends of the housing 22 and are retained in a center bore 30 of an insulating end 32 which seal or close off the ends of the housing 22. As shown in FIG. 2, the gas tube assembly 24 is generally positioned and retained with the end electrodes 28 engaged with the contacts 26. The contacts 26 are generally positioned along a central longitudinal axis 34. In this configuration, the gas tube assembly 24 is generally positioned with the electrodes 28,28 directly in the axial transmission path along the central axis 34. This orientation provides greater transmission capabilities as described below.

The F-F-type connector body configuration using the gas tube assembly 24 of the present invention as shown in FIG. 1 is designed for over-voltage surge protection in a 75 ohm coaxial cable network with frequency ranges from 0 to 1 Ghz. This protector 20 is suited for traditional cable TV networks (CATV), hybrid-fiber coaxial network (HFC) and fiber to the curb (FTTC) systems utilizing coaxial cables. The minimal insertion loss makes the protector 20 of the present invention transparent to system operation. This protector 20 prevents damage to vital system components and provides safety for operation personnel and subscribers. The protector can be configured for 90 or 230 volt operation.

The gas tube assembly 24 of the present invention has an insertion loss at a target frequency of 1 GHz., of approximately −0.01 dB. The return loss of the gas tube assembly 24 of the present invention is approximately 32 dB. As shown in FIGS. 1–5, the gas tube assembly 24 includes a first electrode or platform portion 40, a body portion 42 and a second electrode or cover portion 44. The end electrode 28 described hereinabove extends from both ends of the platform portion 40. The body 42 attaches to the platform portion 40 with the cover 44 attaching over the body 42 at an opposite end from the platform portion 40. A chamber 46 is defined by a wall 47 of the body 42 between the cover 44 and the platform base 40. Discharge areas 48, 50 are provided on the platform 40 and the cover 44, respectively.

The gas tube assembly 24 carried in the housing 22 can be coupled to the inner conductor and outer conductor of a standard coaxial transmission line. As will described in greater detail below, structures are provided to couple the first electrode 40 to the center conductor of the standard coaxial transmission line. Additionally, the second electrode 44 is coupled to the housing so as to provide coupling to the outer conductor of the standard coaxial transmission line. Connection to the coaxial transmission line is not specifically illustrated in the interest of clarity of the present invention. However, it is believed that one of ordinary skill in the art will understand how the standard F-F connector housing 22 is connected to a coaxial transmission line such that the inner and outer conductors of the coaxial transmission line are coupled with the corresponding portions of the protector 20.

As shown in FIGS. 4 and 5, the gas tube assembly 24 can be made using a minimal number of components at a minimal cost. The platform and cover 40,44 are formed of a copper or other highly conductive material using an efficient and inexpensive process such as cold forming. The body 42 is formed of an alumina based ceramic material. The upper edge 52 and the lower edge 54 are metalized to be compatible with the corresponding surfaces of the cover 44 and the platform 40, respectively, thereby allowing brazing of the structures to the body 42. The body 42 is shown as a generally square cross-sectional shape. The shape of the body 42 should not be considered a limitation of the invention because the body 42 could be provided in any one of a number of geometries, for example the body 42 may be cylindrically shaped.

The wide gap spacing 56 between the discharge areas 48,50 of the platform 40 and cover 44 permits passage of microwaves along the transmission path. The gap spacing 56 of the preferred embodiment as shown herein is approximately 0.080 inches whereas other devices typically employ a gap spacing of approximately 0.020 to 0.030 inches. Further, the contacts 26,26 (inside diameter) and the end electrodes 28,28 have a diameter 58 of approximately 0.034 inches. The small diameter 58 of the contacts 26,26 and the end electrodes 28,28 help to achieve desired transmission parameters.

The portions 59 and 61 of the platform 40 and cover 44, respectively, which have the discharge areas 48 and 50 thereon and which, along with the body 42, define the chamber 46, are relatively short and preferably have widths 63 and 65, respectively, of approximately 0.140 inches. The construction of the gas tube assembly 24 of the present invention, that is that the gas tube assembly 24 has electrodes 40, 44 which are fore shortened and have a wide gap space 56 therebetween, helps to minimize signal absorption. This is in contrast to prior art universal type gas tubes which are typically constructed of elongated electrodes sealed into both ends of a ceramic cylindrical tube. The elongated electrodes of these prior art universal type gas tubes create a problem when they are placed in shunt with the inner or central conductor and the outer conductor or shield of the coaxial cable because it presents a large cross-sectional area to the signal transmission which results in high levels of signal absorption and/or reflection. In contrast, the present invention employs a gas tube assembly 24 which has electrodes which are fore shortened when sealed into a ceramic cylinder and placed in shunt with a coaxial transmission line to present a minimum cross-sectional area and thereby produce excellent signal transmission. The gas tube assembly 24 of the present invention does not impede microwave signals and is essentially transparent to microwave signals.

The discharge areas 48, 50 on the platform 40 and cover 44, respectively, include an emission coating for enhancing the surge response and carbon stripes for fast impulse response. A grid pattern is provided in these discharge areas 48, 50 using known techniques to enhance the retention of the emission coating.

The gas tube assembly 24 of the present invention can be assembled using merely three components, the cover 44 attached to the body 42 which is attached to the platform 40. The gas tube assembly 24 is provided in a miniature size for placement inside the chamber 25 of the housing 22. Generally, the gas tube assembly 24 is located inside the housing, symmetrically spaced from both ends of the housing 22. The end electrodes 28, 28 of the gas tube assembly 24 mate with receptacle ends 60 of the contacts 26, 26. A top electrode or protrusion 62 extends from the cover 44 radially outwardly from the central axis 34 and is inserted into a hole 64 in the housing wall. The top electrode 62 can be welded or soldered in the hole 64 to secure this portion of the structure in place.

The opposite ends of the housing 22 are sealed or closed off by the insulating ends 32, 32, with the central bores 30 of each insulating end 32 mating with a receiving end 66 of a corresponding contact 26. A sealing ring 68 is placed outside of each insulating end 32 to retain the assembly within the housing 22. The contacts 26 are formed of a conductive material such that when a central conductor of a coaxial cable is inserted therein, it provides a consistent transmission path therethrough coupling the central conductor to the end electrodes 28. The insulating ends 32 are preferably formed of a polyethylene or Teflon® material.

While a preferred embodiment of the present invention is shown and described, it is envisioned that those skilled in the art may devise various modifications and equivalents without departing from the spirit and scope of the invention. The invention is not intended to be limited by the foregoing disclosure.

What is claimed is:

1. A protector for use with a coaxial transmission line having an inner conductor and an outer conductor, said protector comprising: a housing; a gas tube assembly being retained in said housing and including a first electrode coupleable with the transmission line such that said first electrode being substantially aligned with the inner conductor of the transmission line, said gas tube assembly including a second electrode comprising a cover member coupled to said housing and retained therein, said cover member coupleable with the outer conductor of the transmission line, said first electrode having a surface generally facing said cover member, said surface having a discharge area thereon, said discharge area being generally axially aligned with the inner conductor of the transmission line, said cover member of said gas tube assembly having a discharge area, each of said discharge areas being spaced apart from each other.

2. A protector as recited in claim 1, said discharge areas being spaced apart from each other a distance of approximately 0.08 inches, each of said first and second electrodes having a width dimension of approximately 0.140 inches.

3. A protector as recited in claim 1, said discharge areas being spaced apart from each other a distance of approximately 0.08 inches.

4. A protector as recited in claim 1, said cover member including an extending portion which is coupled to said housing.

5. A protector as recited in claim 1, said first electrode of said gas tube assembly comprising a platform member, said platform member having electrode end portions extending therefrom, each of said electrode end portions engaged with a first end of a corresponding contact engageable with the inner conductor of the transmission line.

6. A protector as recited in claim 1, each of said first and second electrodes being comprised of a conductive material.

7. A protector as recited in claim 1, said gas tube assembly further including a body portion, said body portion contacting said first and second electrodes and spacing apart said discharge areas of said first and second electrodes.

8. A protector as recited in claim 7, said body portion being comprised of a ceramic material.

9. A protector as recited in claim 1, said housing having spaced apart contacts for coupling to an inner conductor of the transmission line, said gas tube assembly retained in said housing, said first electrode of said gas tube assembly comprising a platform member, said platform member having electrode end portions extending therefrom, each of said electrode end portions coupled to a first end of a corresponding one of said contacts for coupling said first electrode to said inner conductor of said transmission line.

10. A protector as recited in claim 9, said first electrode and said contacts being generally positioned along a central longitudinal axis of said housing.

11. A protector as recited in claim 7, said body portion having a wall defining a chamber between at least a portion of said first and second electrodes, each of said portions of said first and second electrodes including said discharge area, said first and second electrodes being attached to said body portion and sealing said chamber.

12. A protector as recited in claim 11, each of said portions of said first and second electrodes having a width dimension of approximately 0.140 inches.

13. A protector for use with a coaxial transmission line having an inner conductor and an outer conductor, said protector comprising: a housing; a gas tube assembly being retained in said housing and including a first electrode coupleable with the transmission line such that said first electrode being substantially aligned with the inner conductor of the transmission line, said gas tube assembly including a second electrode comprising a cover member coupled to said housing and retained therein, said cover member coupleable with the outer conductor of the transmission line such that said second electrode being substantially aligned with the outer conductor of the transmission line, said first electrode having a surface generally facing said cover member, said surface having a discharge area thereon, said discharge area being generally axially aligned with the inner conductor of the transmission line, said cover member of said gas tube assembly having a discharge area, said gas tube assembly further including a body portion, said body portion generally having a square cross-section, said body portion contacting said first and second electrodes and spacing apart said discharge areas, said second electrode of said gas tube assembly including an extending portion which is coupled to said housing.

14. A protector as recited in claim 13, said gas tube assembly being retained in a female-female connector housing.

15. A method of protecting a coaxial transmission line from damage due to transient surge voltages and induced AC power voltages, said transmission line having an inner conductor and an outer conductor, said method comprising: providing a protector comprising a housing, a gas tube assembly retained in said housing and including a first electrode and a second electrode, said second electrode comprising a cover member coupled to said housing and retained therein, said first electrode having a surface generally facing said cover member, said surface having a discharge area thereon, said cover member of said gas tube assembly having a discharge area, each of said discharge areas being spaced apart from each other; coupling said first electrode of said protector to said inner conductor of the transmission line so that said first electrode is substantially aligned with the inner conductor of the transmission line and said discharge area on said surface of said first electrode is generally axially aligned with the inner conductor of the transmission line; and coupling said second electrode of said protector to said outer conductor of said transmission line.

16. A method of permitting passage of microwaves along a coaxial transmission line having an inner conductor and an outer conductor and having a protector coupled thereto, said protector comprising a housing, a gas tube assembly retained in said housing and including a first electrode and a second electrode, said second electrode comprising a cover member coupled to said housing and retained therein, said first electrode of said protector being coupled to said inner conductor of the transmission line so that said first electrode is substantially aligned with the inner conductor of the transmission line, said second electrode of said protector being coupled to said outer conductor of the transmission line, said first electrode having a surface generally facing said cover member, said surface having a discharge area thereon, said discharge area being generally axially aligned with the inner conductor of the transmission line, said cover member of said gas tube assembly having a discharge area, each of said discharge areas being spaced apart from each other defining a gap therebetween; and allowing the passage of said microwaves along said coaxial transmission line, and along said first and second electrodes of said gas tube assembly of said protector.

* * * * *